United States Patent [19]

Nourbakhsh et al.

[11] Patent Number: 5,793,900
[45] Date of Patent: Aug. 11, 1998

[54] GENERATING CATEGORICAL DEPTH MAPS USING PASSIVE DEFOCUS SENSING

[75] Inventors: Illah Reza Nourbakhsh, Stanford; David Andre, Menlo Park, both of Calif.

[73] Assignee: Stanford University, Stanford, Calif.

[21] Appl. No.: 581,245

[22] Filed: Dec. 29, 1995

[51] Int. Cl.⁶ .................... G06K 9/00; G06K 9/40
[52] U.S. Cl. .................. 382/263; 348/139; 348/348; 348/355; 356/2; 356/376; 382/106; 382/107; 382/153; 382/154; 382/255; 382/262
[58] Field of Search .................... 382/106, 107, 382/153, 154, 255, 262, 263; 356/2, 376; 348/139, 348, 355

[56] References Cited

U.S. PATENT DOCUMENTS

| | | | |
|---|---|---|---|
| 4,123,778 | 10/1978 | Graf et al. | 348/135 |
| 5,144,373 | 9/1992 | Moler | 356/2 |
| 5,151,609 | 9/1992 | Nakagawa et al. | 250/559.22 |
| 5,227,973 | 7/1993 | Marcantonio | 364/424 |
| 5,231,443 | 7/1993 | Subbarao | 396/93 |
| 5,365,597 | 11/1994 | Hoieva | 382/318 |
| 5,550,602 | 8/1996 | Braeuning | 351/243 |

*Primary Examiner*—Leo H. Boudreau
*Assistant Examiner*—Daniel G. Mariam
*Attorney, Agent, or Firm*—Lumen Intellectual Property Services

[57] ABSTRACT

A method is disclosed for generating a categorical depth map of a scene using passive defocus sensing. In a preferred embodiment three synchronized CCD cameras focused at different distances detect three images of the same scene. An image processor partitions the images into an array of regions and calculates a sharpness value for each region. The sharpness value for a region is calculated by summing over all pixels (x,y) in the region the absolute difference in the intensity value of a pixel (x,y)( with pixel (x–k,y–l), where k and l are constants. The image processor then constructs a depth map of the scene by determining for each region the image with the greatest sharpness in that region. An application of the invention to a mobile robot control system is described in detail. Among other applications, the method may be used for collision avoidance, object detection, and speed measurement.

20 Claims, 11 Drawing Sheets

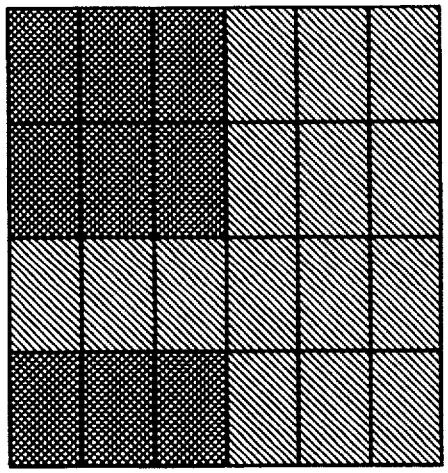
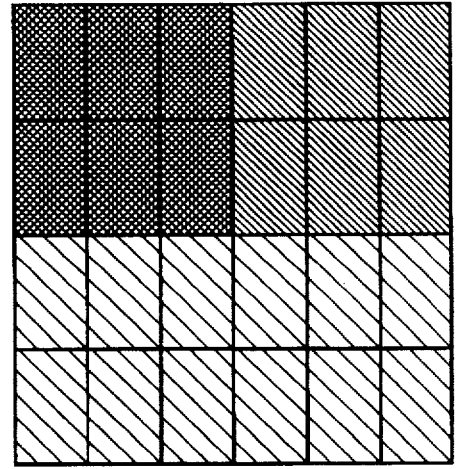
FIG. 2B
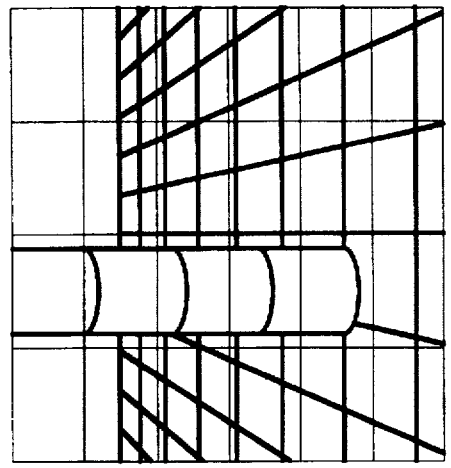
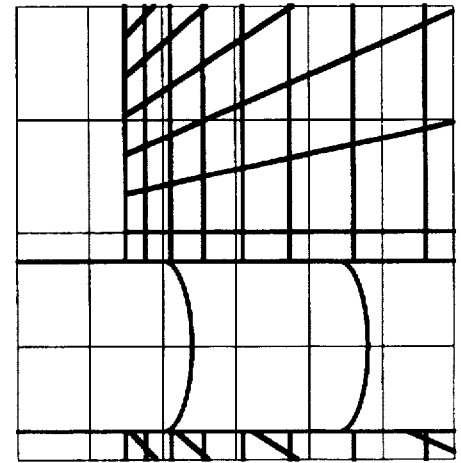
FIG. 3B
FIG. 2A
FIG. 3A

GENERATING CATEGORICAL DEPTH MAPS USING PASSIVE DEFOCUS SENSING

FIELD OF THE INVENTION

This invention relates to image acquisition and analysis. More particularly, it relates to techniques for generating categorical depth information of a scene using passive defocus optical sensing.

BACKGROUND OF THE INVENTION

In many technological fields it is desirable to have a method for sensing the distances of objects, and in particular to have a method for producing a map including distance information of objects in the environment. It is especially desirable to have such a method that is fast, simple and robust so that it may be implemented in real-time applications such as robotics.

Active ranging techniques probe the environment and use feedback from the objects to determine their distances. Many active ranging techniques, however, have significant disadvantages such as high directionality, interference with other active ranging devices, false echoes due to multipath, unreliability due to variations in the reflective properties of objects, and wash-out due to high levels of ambient radiation.

Passive ranging techniques, on the other hand, do not actively probe the environment. Instead, they determine distances by detecting and analyzing signals naturally arriving from the objects—either signals generated by the objects themselves, or signals generated by other sources and then reflected from the objects. Passive ranging devices can, in principle, avoid many of the difficulties of active ranging. Because they use the ambient radiation rather than transmitting their own signals, they require less power and do not interfere with each other.

Some forms of passive ranging, however, have limited practical applications. Passive sonar, for example, is not practical for many applications because it can usually only detect objects that are producing sound. Passive optical ranging, on the other hand, is much more practical because many environments have sufficient ambient radiation and most objects have good reflective properties. Stereoscopic ranging, one of the passive optical ranging methods used in human binocular vision, is evidently a method that has practical potential. Because of the inherent complexity of finding correspondences between the stereo images, however, no stereoscopic ranging device known at present can inexpensively and reliably produce depth information about an entire scene in real time. Depth-from-motion ranging techniques have similar complexity and also suffer from the same limitations.

A comparatively successful optical passive ranging method is depth from focus ranging, which determines distances by measuring the degree of focus of an image. A primitive form of depth from focus ranging is found in many modern cameras, which use an autofocus method for adjusting the camera's focal length to increase the degree of focus. These autofocus methods, however, do not actually produce range information. Moreover, they only generate a single focus measure for the entire image and are too simple to create depth information about multiple objects at different distances in the same field of view. More sophisticated methods that produce depth maps, however, are complicated, expensive and computationally complex.

Details of the various optical ranging methods discussed above are disclosed in the following U.S. Patents. Sarfati et al. (U.S. Pat. No. 5,003,165) and Fujiwara et al. (U.S. Pat. No. 4,994,920) disclose autofocus methods. They are directed to focusing rather than ranging and do not generate depth information about multiple objects in the field of view. These methods are also slow because they require mechanically changing the focusing elements of an optical system. Subbarao (U.S. Pat. No. 5,231,443) discloses an autofocus and autoranging method based on image defocus. This method also generates only a single focus measure for an image and does not produce depth information about multiple objects in the field of view. In addition, it is computationally complex, requiring the calculation of Fourier coefficients and the application of a log-by-rho-squared transform. It is slowed further because it requires mechanically adjusting the lenses in the camera. The passive ranging system based on focus sensing disclosed by Holeva (U.S. Pat. No. 5,365,597) is also computationally complex, requiring the calculation of a Fourier transform. Although Holeva discloses the use of two cameras, the method disclosed nevertheless requires mechanical movement of the lenses in one camera in order to obtain the proper focusing position.

The only prior art that uses a relatively simple algorithm for generating a depth map of scene using passive defocus ranging is the method of Nakagawa et al. (U.S. Pat. No. 5,151,609). The first step of the disclosed method is the picking up of a plurality of images having different focus distances. The method disclosed by Nakagawa, however, uses one camera to obtain multiple images at various focal points. This method is slow because it requires the mechanical movement of the lenses in the camera, or the entire camera. Moreover, it requires frame memories to store the successive frames until they may be compared, adding cost and complexity to the system. Furthermore, Nakagawa's method requires that the scene remain motionless throughout the process of the image acquisition, thereby limiting the utility of the method to static environments. These disadvantages were not addressed by Nakagawa and no methods were disclosed to avoid them.

The disclosed method of Nakagawa includes a step of calculating a focus measure $F(x,y)$ for each image $V(x,y)$. The simplest and fastest method disclosed by Nakagawa includes first calculating a contrast image $C(x,y)$ by comparing the intensity of each point with that of its four horizontal and vertical neighbors. The focus measure at each point is then calculated to be a summation of the neighboring contrast image values. Although this algorithm is much simpler than other methods involving, for example, the calculation of Fourier coefficients, it is still unnecessarily complex and slow. The algorithm disclosed by Nakagawa is slowed further by the next step, which requires the calculation of the focus level for each and every point in the image.

In summary, the prior art methods for depth-from-focus suffer from one or more of the following disadvantages. They involve computationally expensive algorithms that increase cost and reduce speed, they require mechanical movement of optics that reduces speed and prevents dynamic real-time applications, they are inoperable in bright light out of doors, they are highly directional or limited in range, they are limited to the analysis of static scenes using motionless cameras, and they do not provide depth information about multiple objects in a single scene. There presently exists a need, therefore, for a depth from focus method that overcomes the limitations of the present art, providing an extremely simple, robust and fast method for generating depth from focus information about objects in a scene.

OBJECTS AND ADVANTAGES OF THE INVENTION

Accordingly, it is a primary object of the present invention to provide a simple, fast and robust method of generating depth information in real time about multiple objects in a scene. It is a further object of the invention to provide such a method that may be implemented in a device whose operation does not interfere with the operation of other such devices in the vicinity. It is an additional object of the invention to provide such a method that can operate in a wide variety of environmental conditions and, in particular, out of doors in bright sunlight and in circumstances involving relative motion between the camera and objects in the scene. It is a further object of the present invention to provide such a method that is sufficiently fast, simple and robust to be useful in a wide range of applications with minimal cost.

SUMMARY OF THE INVENTION

These objects and advantages are attained by a method for generating a categorical depth map of a scene using passive defocus sensing. Surprisingly, the inventors have discovered that an accurate categorical depth map may be constructed using a method that is faster and simpler than anyone skilled in the art has previously suspected possible.

The method comprises the step of detecting n images of a scene using n cameras focused at different distances, determining a sharpness value for each of m regions of each of the n images, and assigning a categorical depth value to each of m depth map regions, where the depth value is determined from the sharpness values for the n image regions corresponding to the depth map region. In the preferred embodiment the depth value is found by selecting among the n image regions corresponding the depth map region a region having a maximal sharpness value.

Other embodiments of the invention further include the steps of synchronizing the n cameras so that they simultaneously detect the n images of the scene, orienting the n cameras so that the n images represent very similar but slightly different perspectives of the scene, and using at least one beamsplitter to ensure that the n cameras view the scene from the same perspective. The sharpness value for each image region is determined by finding, for each pixel in the region, the absolute difference between the intensity value of the pixel and the intensity value of a nearby pixel, and summing together the absolute differences found for all the pixels in the region. In the preferred embodiment, the nearby pixel is a pixel horizontally displaced by k pixels and vertically displaced by l pixels.

The invention also includes a device for producing a categorical depth map of a scene, where the device comprises n camera means for detecting n images of the scene, where the n camera means are focused at different distances, and where each of the n images comprises m image regions which are in one-to-one correspondence with the m depth map regions. The device further comprises an image processing means for determining a sharpness value for each region of the m image regions in each image of the n images, and a comparing means for assigning a categorical depth value to each depth map region of the m depth map regions, where the depth value for a depth map region is determined from the sharpness values for the n image regions corresponding to the depth map region. The preferred embodiment of the invention further comprises a synch means for synchronizing the n camera means with each other so that they simultaneously detect the n images of the scene. In the preferred embodiment the n camera means are oriented so that the n images represent very similar but slightly different perspectives of the scene due to their different positions. In an alternate embodiment of the invention the device includes a beam splitting means for ensuring that the n cameras view the scene from the same perspective. Another embodiment includes a filtering means for reducing the intensity of light detected by the n camera means, and n adjustable aperture means for controlling the amount of light detected by the n camera means. Still other embodiments may acquire n images using less than n physical CCD chips, by dividing a CCD chip into more than one sub-chip, each sub-chip receiving a full image of the scene. The invention has many applications such as collision avoidance, motion detection, detection of the direction of motion, drop-off or step detection, object detection, speed detection, and assisting visually impaired persons.

DESCRIPTION OF FIGURES

FIGS. 2A and 2B show a scene and the corresponding depth map generated by the method of the invention.

FIGS. 3A and 3B show a scene and the corresponding depth map generated by the method of the invention.

DETAILED DESCRIPTION

Figure 1:
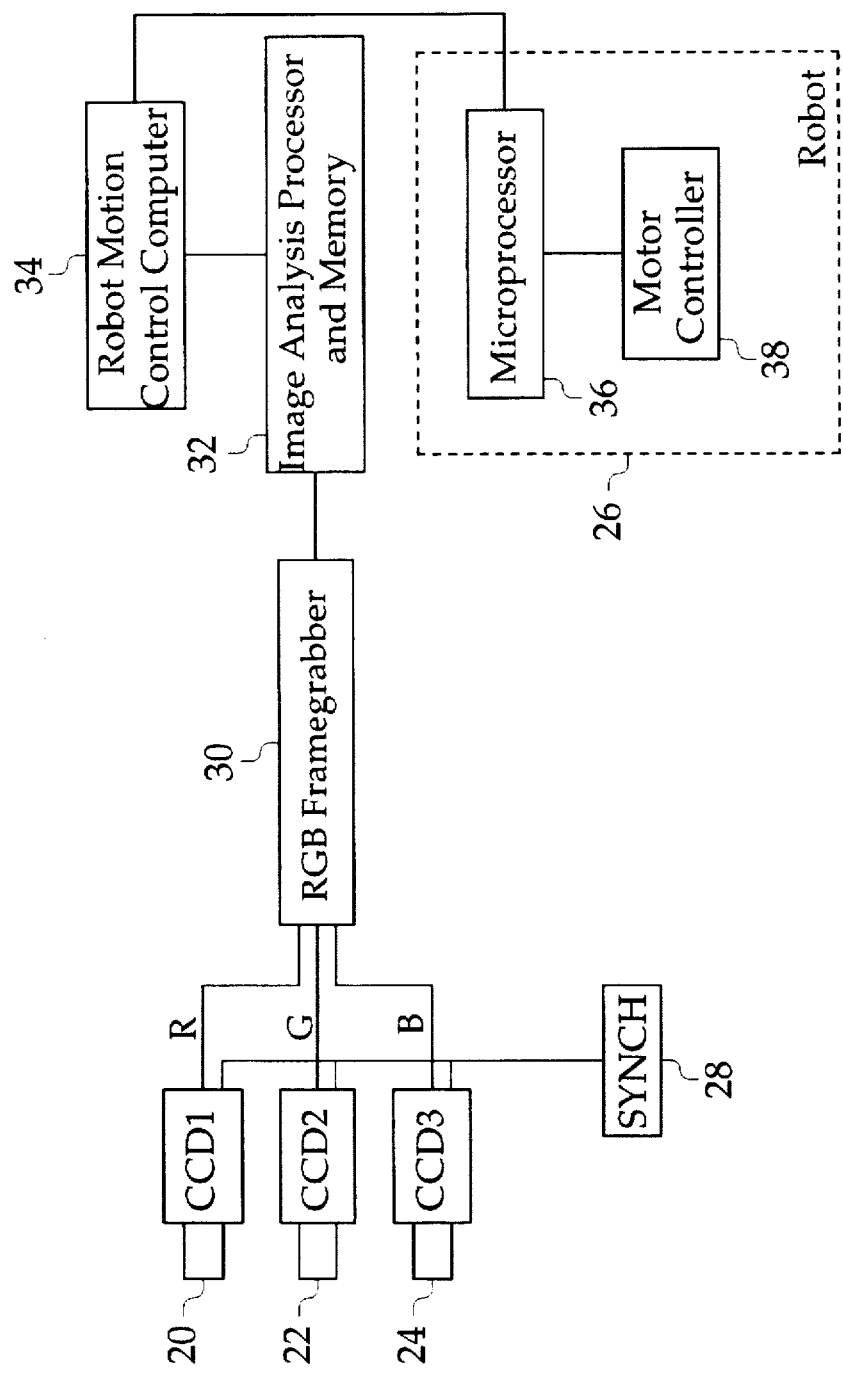
FIG. 1 is a block diagram of one embodiment of the invention.

Although the method of the present invention permits a wide range of application, the principles and methods of carrying out the invention are illustrated in the following preferred embodiment. In this application, the method of the invention is used as an essential component of an obstacle avoidance system for a mobile robot, as illustrated in FIG. 1.

Each of three ⅔" charge-coupled-device (CCD) cameras 20, 22, and 24 has a resolution of 768×493 and a 12 mm lens focused at a distance of 0.4 m, 1.0 m, and 2.0 m, respectively. The cameras are mounted on a robot 26 in a common direction approximately 35 degrees below the horizontal plane and synchronized by a SYNCH signal 28 so that they simultaneously capture their respective images of the scene. The synchronized image signals from the three cameras are fed into the R, G, and B input lines of an RGB framegrabber 30 which digitizes the signals. The digitized images are then transferred over a bus to a microprocessor and memory 32 for image processing. Direct memory access over the bus enables the recovery of 8 bits of intensity per pixel at 15 frames per second.

Figure 5B:
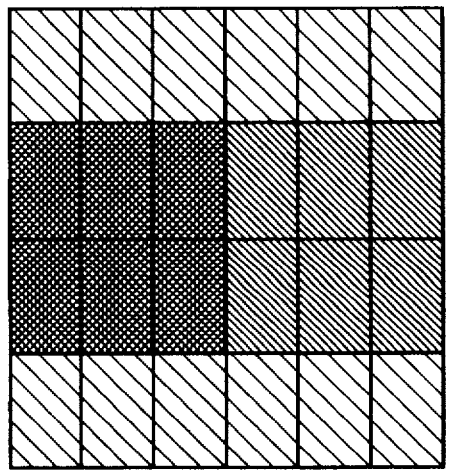
FIGS. 5A and 5B show a scene and the corresponding depth map generated by the method of the invention.
Figure 4B:
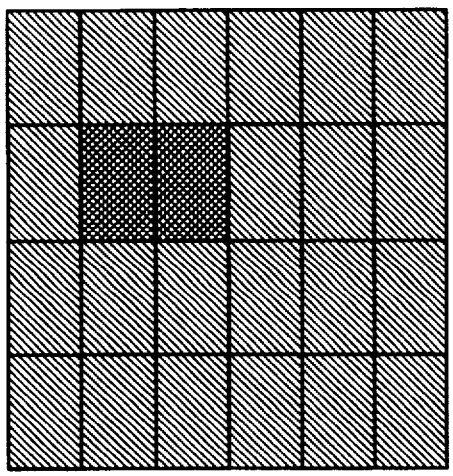
FIGS. 4A and 4B show a scene and the corresponding depth map generated by the method of the invention.
Figure 5A:
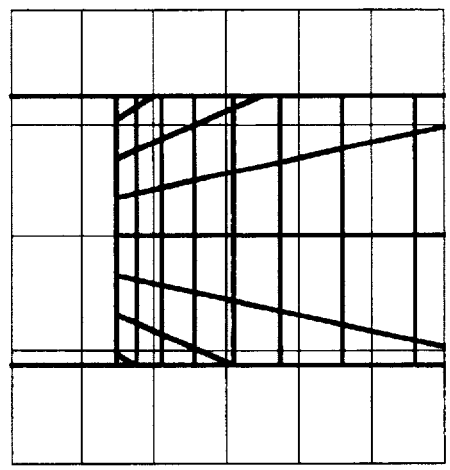
Figure 4A:
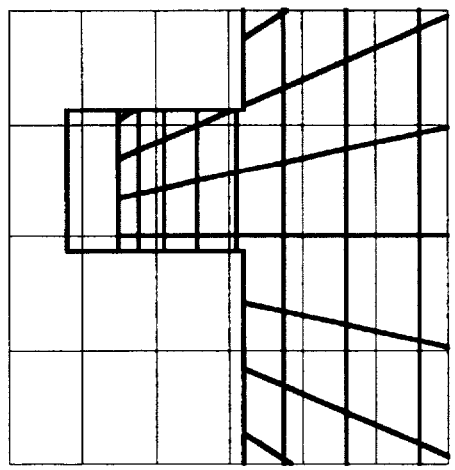
Figure 6A:
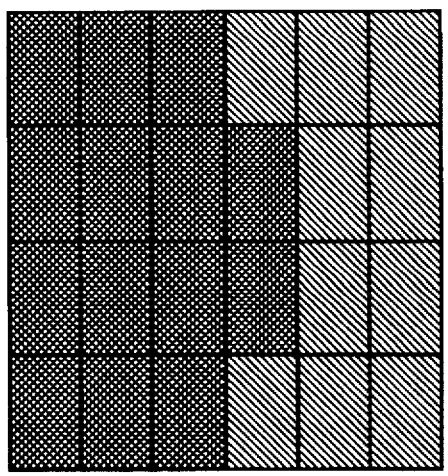
FIGS. 6A and 6B show a scene and the corresponding depth map generated by the method of the invention.
Figure 7A:
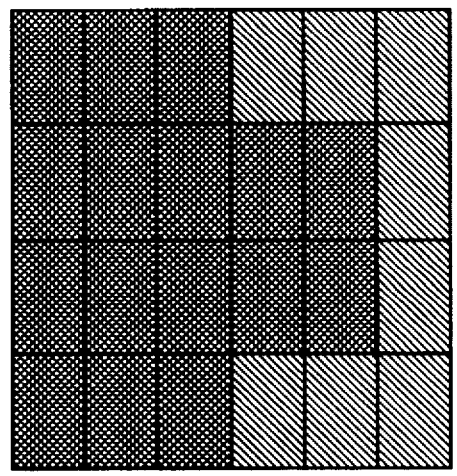
FIGS. 7A and 7B show a scene and the corresponding depth map generated by the method of the invention.
Figure 6B:
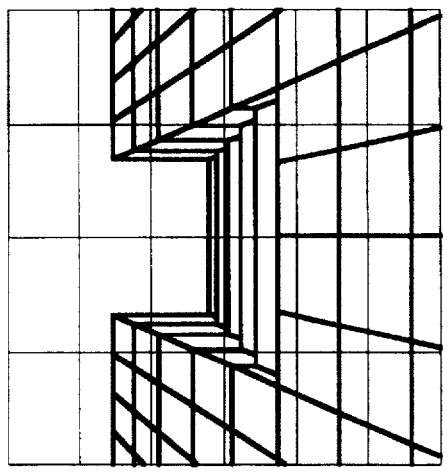
Figure 7B:
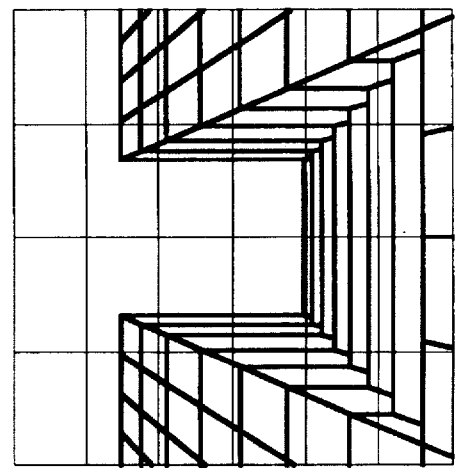

The microprocessor and memory 32 breaks each image into an array of image regions, analyzes the regions, and generates a depth map. This image processing is described in detail below in reference to FIGS. 9–13. The depth map is an array of categorical depth values, each value indicating the depth of the scene for a given region. Depth values of 2, 1, and 0 correspond to close, medium, and far, respectively. The present embodiment of the invention uses an 8×5 array of regions for the depth map. It is clear, however, that any array size may be used and the 8×5 array is just one choice. For example, FIG. 2A shows a scene divided into a 4×6 array of regions. FIG. 2B shows the corresponding depth map of the same scene, where medium regions are medium shaded, and far regions are darkly shaded. FIG. 3A shows the same scene after the robot has moved forward and FIG. 3B shows the corresponding depth map where the close regions are lightly shaded. FIG. 4A shows a scene of a doorway and FIG. 4B shows its depth map. FIG. 5A is the same scene after the robot has moved forward and FIG. 5B is the corresponding depth map; FIG. 6A shows a scene of a staircase and FIG. 6B shows its depth map. FIG. 7A is the same scene after the robot has moved forward and FIG. 7B is the corresponding depth map. It is obvious that by using more than three cameras, additional depth resolution can be obtained for the depth map. Also, the focus distances of the cameras may be set to different values in order to adapt the system to various different applications.

Referring back now to FIG. 1, after the depth map of the scene is generated by microprocessor and memory 32, it is then communicated to a robot motion control computer 34. Based on the depth map information, control computer 34 sends appropriate robot motion control signals to the robot 26, directing the robot to move while preventing collision with objects in the environment. Robot 26 may be any one of several commercially available robots, such as the Nomad 150 available from Nomadic Technologies, Inc. Robot 26 comes equipped with a microprocessor 36 and motor controller 38 for controlling the motion of the robot in three independent degrees of freedom: forward and backward translation, rotation of the wheel base, and rotation of the turret.

Figure 8:
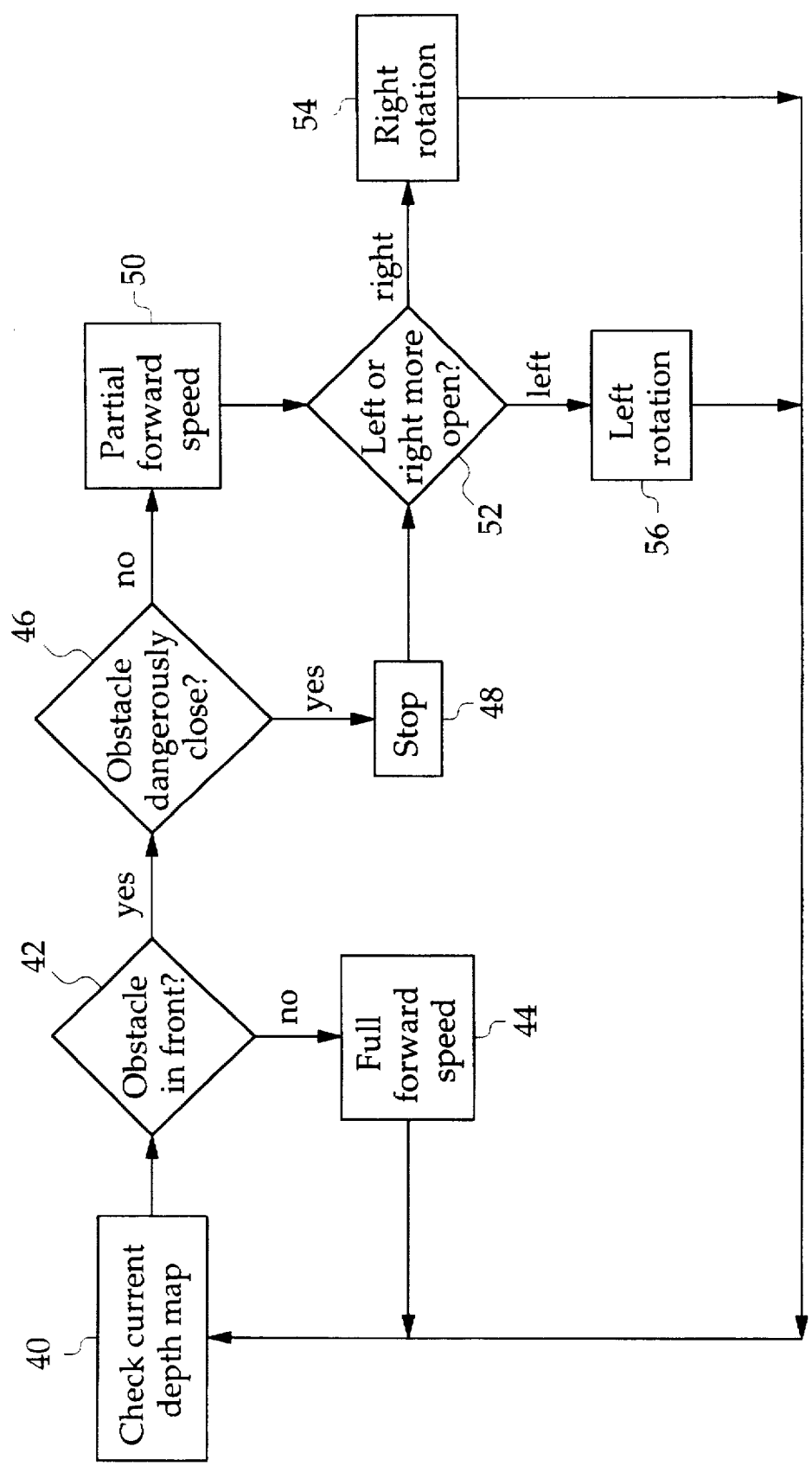
FIG. 8 is a flow chart for the robot control algorithm used in one embodiment of the invention.

FIG. 8 is a flow chart of a simple motion control algorithm for the robot. At the beginning of each cycle of the control loop the current depth map is checked (block 40). The first step of the control loop (decision block 42) checks if there is an obstacle in front of the robot. Normally, when the robot is facing a flat open floor, the bottom rows of the depth map have value 1 (medium range) and the top rows have value 0 (far range). If this normal depth map, or one very close to it, is indicated, then there is presumably no obstacle in front of the robot and the robot is sent a control signal to go forward at full speed (block 44). The control loop is then closed and the depth map is checked again (block 40).

If the depth map deviates from the normal depth map, then it is presumed that an obstacle is in front of the robot and it is then determined whether an obstacle is dangerously close or not (decision block 46). A dangerously close obstacle is indicated by the presence of values 2 (close) in any rows (e.g. FIGS. 3B and 5B), or by the presence of values 0 (far) in the lower rows (e.g. FIG. 7B). If an obstacle of either kind is dangerously close, then a stop signal is sent to the robot (block 48). If, on the other hand, the obstacle is not dangerously close (e.g. FIGS. 2B, 4B, 6B) then a signal to proceed at partial forward speed (block 50) is sent to the robot. In either case, it is then decided whether the left or right portion of the scene is more open (decision block 52). This decision is made by comparing the values in the left columns to the values in the right columns. If the right columns have smaller values than the left columns, then the right is more open and a control signal is sent to rotate the robot to the right (block 54). Conversely, if the left columns have smaller values, then a control signal is sent to rotate left (block 56). In either case, the control loop is then closed and the current depth map is again checked (block 40). In general, a control algorithm is a function that assigns to each possible depth map a unique control signal. It will be appreciated by anyone skilled in the art that different or more complicated control algorithms may be devised to accommodate various different applications of the invention.

Figure 9:
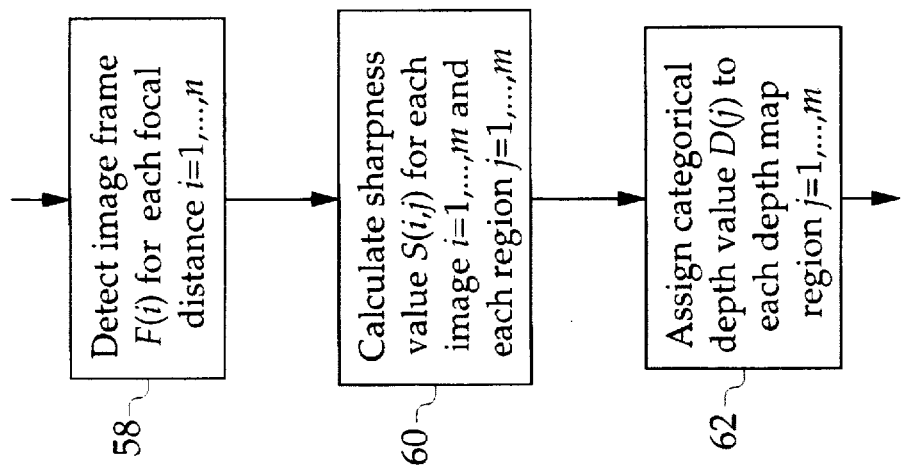
FIG. 9 is a flow chart describing the procedure for generating a depth map from n images according to the invention.
Figure 10:
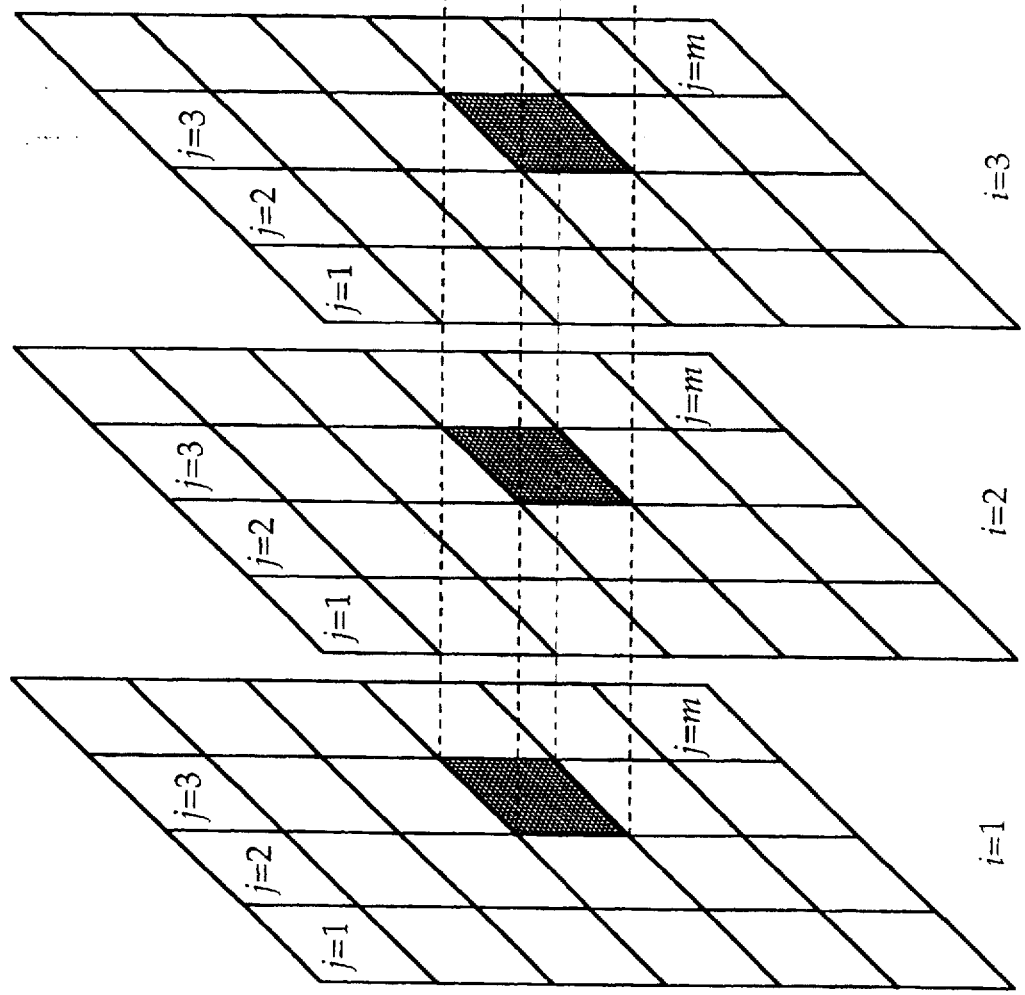
FIG. 10 is a schematic illustration of the correspondences between multiple image regions and depth map regions.

The method for processing the images and generating the depth map will now be described in detail. A flow chart of the general procedure is shown in FIG. 9. The first step (block 58) uses n CCD cameras focused at different distances to detect n corresponding images $F(1), \ldots, F(n)$ (indexed by $i=1,2,\ldots,n$). Although n=3 in the present embodiment, other values of n may be preferable in other applications and depending on the trade-offs between speed and cost. Each of the n images is divided into m regions (indexed by $j=1,2,\ldots,m$) as shown in FIG. 10. The number of regions m may be chosen to be greater or lesser depending on the requirements of the particular application. For high speed and low resolution, a smaller value of m is preferred, while higher resolution may be obtained at the cost of speed with larger values of m.

The second step (block 60) in the flowchart of FIG. 9 comprises calculating a sharpness value $S(i,j)$ for each image i and each region j. As described below in reference to FIGS. 12 and 13, the sharpness value of a region is a nonnegative measure of the contrast between the pixel intensities in that region. A larger sharpness value indicates that the portion of the image in a given region is more in focus. The final step in the procedure (block 62) uses the sharpness values to construct a depth map. The depth map is an array of m categorical depth values $D(j)$, each of which corresponds to n image regions as shown in FIG. 10. The depth value $D(j)$ of a depth map region j is the image number i of the sharpest image region among the n image regions corresponding to depth map region j, e.g., $D(j)=2$ if $S(2,j)$ is greater than both $S(1,j)$ and $S(3,j)$.

Figure 11:
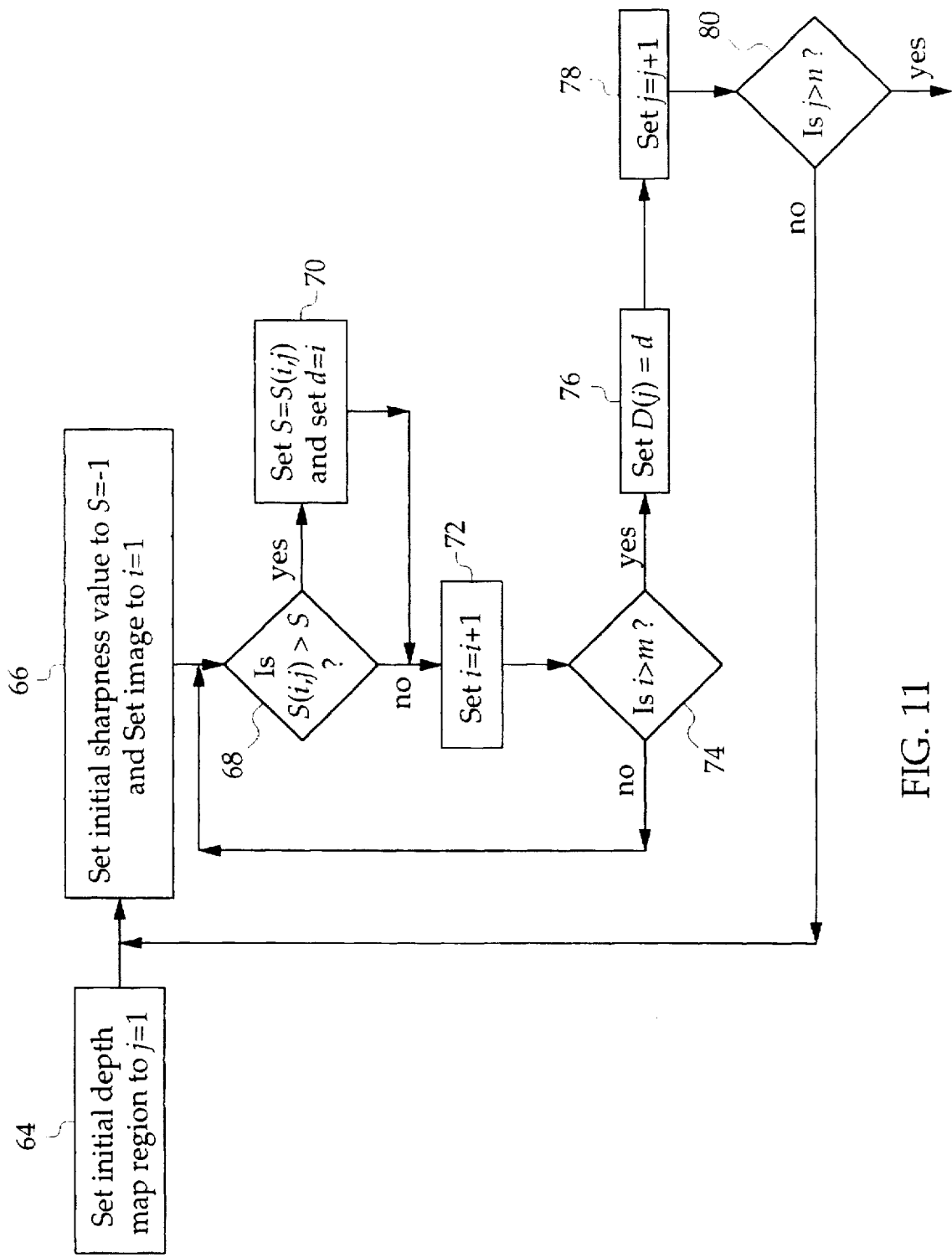
FIG. 11 is a flow chart describing the procedure for building a depth map from image region sharpness values.

A flow chart of the procedure for generating the depth map $D(j)$ from the calculated sharpness values $S(i,j)$ is shown in FIG. 11. The first step (block 64) initializes the region index to $j=1$. The next step (block 66) initializes the sharpness value to $S=-1$ for the current region and initializes the image index to $i=1$. (Since $S(i,j) \leq 0$ for all i,j, it is safe to initialize S to −1). A loop (blocks 68, 70, 72, and 74) determines the largest sharpness value $S(i,j)$ among the images and sets a variable d equal to the corresponding image number. After the loop is completed the depth value $D(j)$ is set to d (block 76) and the region index j is incremented (block 78). If all the regions have not been assigned a depth value (decision block 80) then control is transferred back up to the beginning of the loop (block 66).

Figure 12:
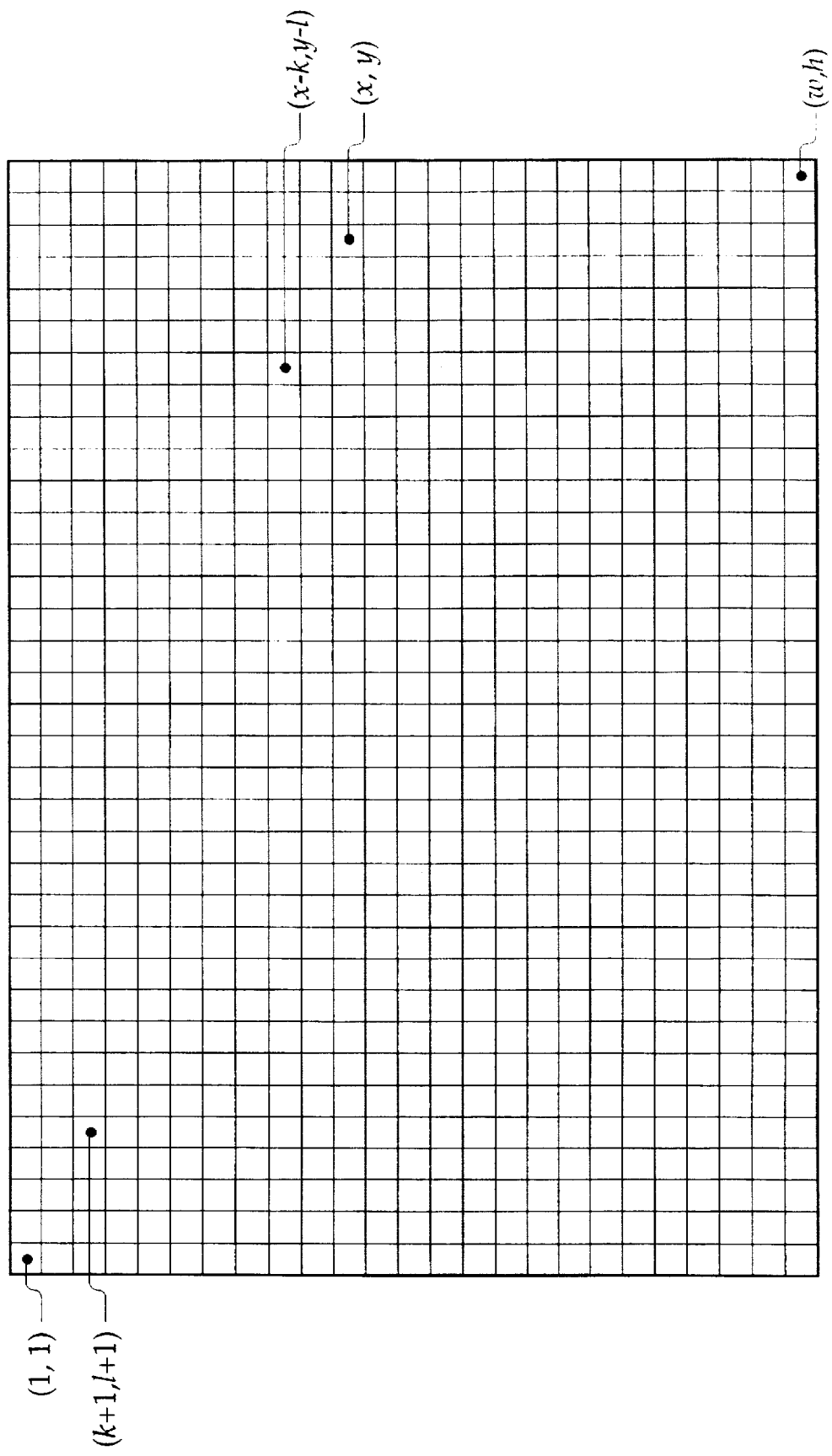
FIG. 12 is a schematic illustration of the pixels in an image region.

The following describes the details of the procedure for calculating the sharpness value for a given region. FIG. 12 shows a single image region divided into individual pixels.

Each pixel is assigned a coordinate (x,y) relative to the upper left pixel whose coordinate is (1,1). The region is w pixels wide and h pixels high. The sharpness value S(i,j) of a region is given by the formula $$S(i,j) = \sum_{y=l+1}^{h} \sum_{x=k+1}^{w} |p(x,y) - p(x-k, y-l)|$$

where p(x,y) is the pixel intensity value of pixel (x,y) and where (k,l) is the relative displacement between the pixels whose intensities are compared. Note that each pixel is compared to at most two other pixels in the region and that the compared pixels are not necessarily adjacent to each other. Indeed, in the present embodiment (k,l)=(4,2). It is surprising and new that an accurate sharpness measure may be derived by comparing pixels that are not adjacent and by comparing so few pixels.

Figure 13:
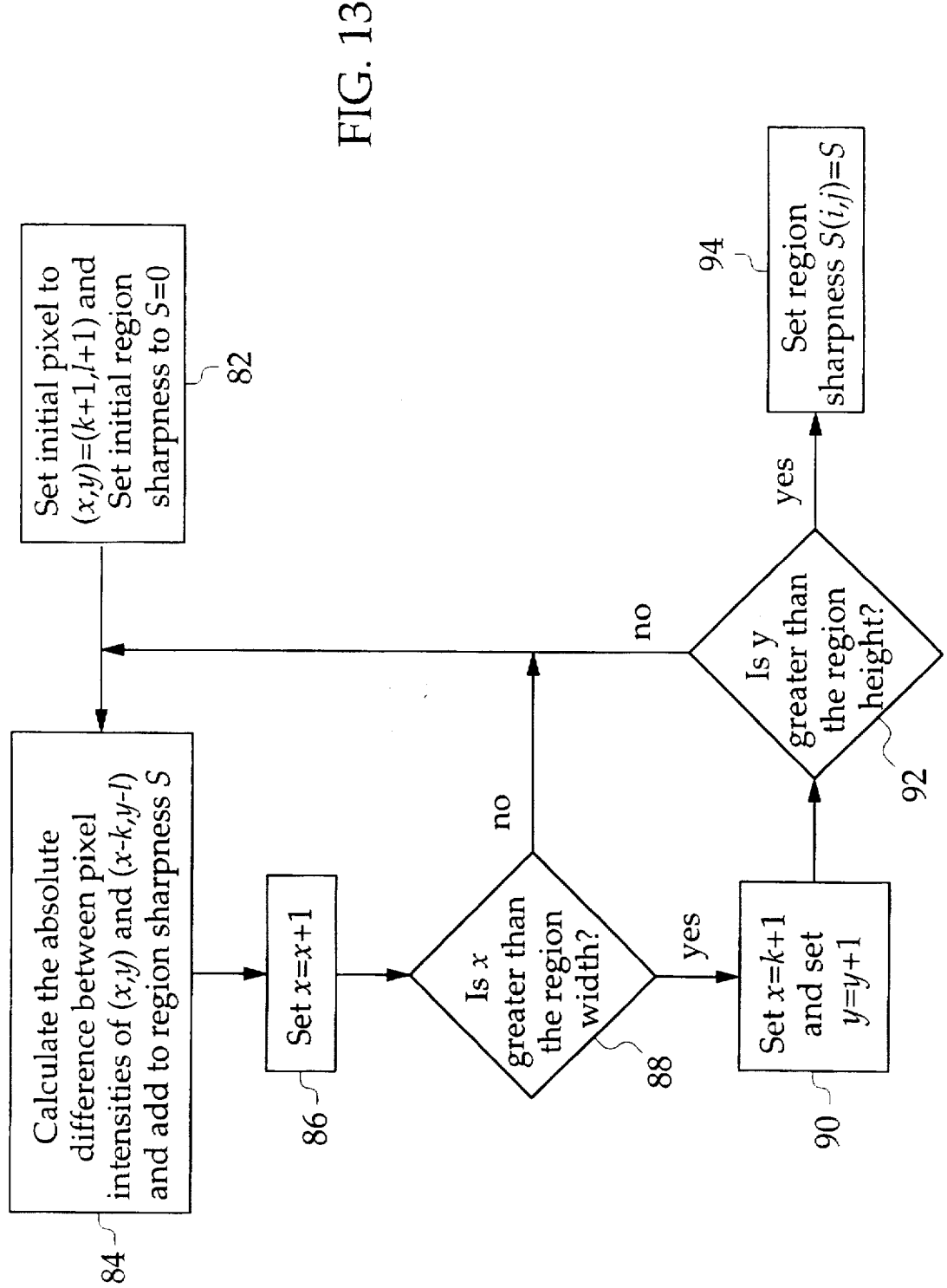
FIG. 13 is a flow chart describing the procedure for calculating the sharpness value of an image region.

FIG. 13 is a flow chart indicating the method for calculating the sharpness value for a region. First the initial pixel position is set to (x,y)=(k+1,l+1) and the region sharpness is set to S=0 (block 82). Two nested loops are then used to calculate the absolute differences between pixel intensity values in the region. The first step of the loop (block 84) calculates the absolute value of the difference between p(x,y) and p(x-k,y-), then adds this value to the region sharpness S. The pixel position is then moved one pixel to the right (block 86). Control returns to the beginning of the loop (block 84) unless the pixel position has moved beyond the right border of the region (block 88), in which case the pixel is moved down one row and back to the left (block 90). Control is returned to the top of the loop (block 84) unless the pixel position has moved beyond the bottom border of the region (block 92), in which case the sharpness for the region S(i,j) is set to S (block 94).

Although the above algorithms have been described sequentially for the purposes of clarity, in the preferred embodiment the generation of the depth map is performed as the image data is transferred from the RGB framegrabber. Because the processing of the images proceeds in parallel with the digitization of the images by the RGB framegrabber, the frame rate is significantly faster than a sequential processing implementation. Moreover, less buffer memory is required for storing the images prior to their analysis. Further speed-ups are possible by parallelizing the contrast computation for the n images and by parallelizing the comparison of corresponding regions to determine regions with maximal contrast.

Figure 14:
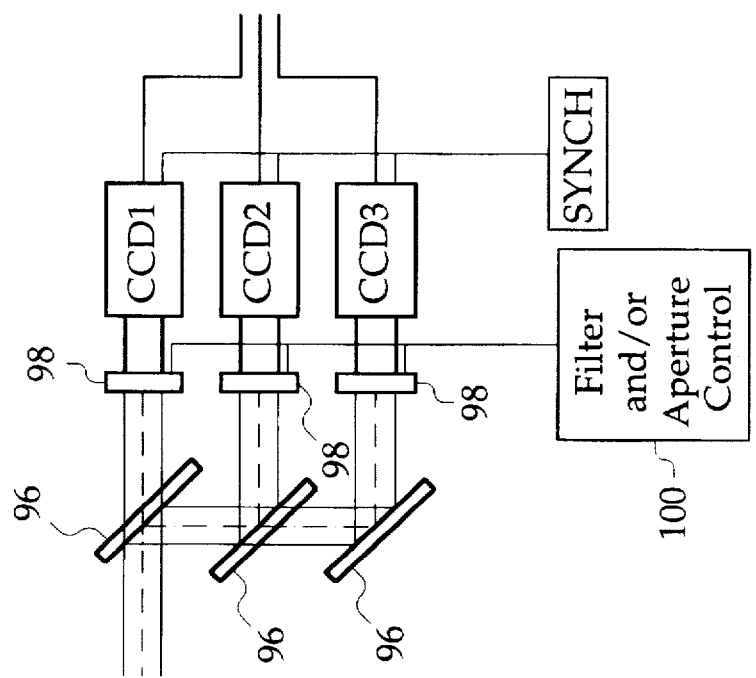
FIG. 14 is a block diagram of an alternate embodiment of the invention including a beamsplitter and filters or apertures.

It is important to note that in the preferred embodiment of the invention the cameras, due to their different spatial positions, necessarily detect images of the scene from slightly different perspectives. Surprisingly, the inventors have discovered that this difference does not significantly reduce the accuracy of the resulting depth map. Nevertheless, in other embodiments of the invention where more precision is required, a beamsplitter 96 is used to ensure that the three cameras receive identical images, as shown in FIG. 14. In this embodiment the cameras are provided with light filters and/or apertures 98 that may be adjusted automatically by a filter and/or aperture control 100 in order to adapt the robot to changing light conditions in its environment. The filters may include but are not limited to neutral density gels, polarizers and LCD screens. Note that some CCD's have exposure or shutter controls that allow the amount of incoming light to be adjusted without the use of additional filters. Using filters or exposure control to reduce the intensity of the light has the advantage that the aperture may remain large. In case there is insufficient light rather than too much light, headlights or strobe lights synchronized with the cameras may be added.

It will be obvious to anyone of ordinary skill in the art that the specific features of the robot, the number and type of CCD cameras, and other details of the system may be changed without departing from the spirit of the invention. More generally, the application of the invention to other contexts may involve other obvious changes. For example, the number of cameras may be changed to increase depth information, the number of regions per image may be changed to increase depth map resolution, and the relative separation of the pixels that are compared in the computation of sharpness may be changed. In addition, although the preferred embodiment implements the algorithm using digital signal processing circuitry, the inventors have also implemented the algorithm using analog processing circuitry. It should also be noted that, in applications where it may be desirable to sacrifice speed for depth resolution, the n cameras may be used to gather more than n images by mechanically changing the focus distances of the cameras. The simultaneous use of n cameras and the extremely efficient algorithm of the invention provide significant improvements in speed over the prior art in such applications.

Anyone of skill in the art will also appreciate that this method for generating categorical depth information of a scene using passive defocus sensing has many other applications in addition to the specific robotic application used above for purposes of illustration. For example, the method may be used to assist wheelchair guidance for avoiding objects and drop-offs. It may be used as a general purpose object or motion detector for use in automatic door openers, outdoor light triggers, and automobile blind spot detectors. It could be used in many industrial applications for sorting, identification, and manipulation of materials and articles. By measuring the time difference between changes in the depth map, the direction and magnitude of velocities may be determined. The device could therefore be used to measure various types of movement. For example, it could replace radar for automobile speed measurement, one advantage being that it is passive and can not be detected by speeding motorists attempting to evade detection.

The depth map recovery method of the invention may also be used to assist visually impaired persons by communicating the depth map to them through an auditory or tactile interface. For example, an auditory interface might use variations in frequency, wave form, and amplitude to indicate the direction and distance of objects in the field of view. A tactile interface may use a matrix of active Braille display elements to directly display the depth map.

In view of the many possible variations and applications of the disclosed method, the scope of the invention should be determined not by the specifics contained in the description but by the following claims and their legal equivalents.

I claim:

1. A method for generating a categorical depth map of a scene, the depth map comprising m depth map regions, where m≧1, the method comprising the steps of:

detecting n images of the scene using n cameras focused at different distances, where n>1;

dividing each of the n images into m predetermined two-dimensional image regions such that each depth map region corresponds to n similar image regions taken from the n images;

determining a sharpness value for each region of the m image regions in each image of the n images;

identifying, for each depth map region, an image number of a sharpest image selected from the n similar image regions taken from the n images, wherein the sharpest image has a maximal sharpness value; and assigning a categorical depth value to each depth map region of the m depth map regions, where the depth value for a depth map region is determined from an image number of the sharpest image identified for the depth map region.

2. The method of claim 1 further comprising the step of synchronizing the n cameras so that they simultaneously detect the n images of the scene.

3. The method of claim 1 further comprising the step of orienting the n cameras so that the n images represent very similar but slightly different perspectives of the scene.

4. The method of claim 1 further comprising the step of using at least one beamsplitter to ensure that the n cameras view the scene from the same perspective.

5. The method of claim 1 wherein the step of determining a sharpness value for each region of the m image regions comprises:

finding, for each pixel in the region, the absolute difference between the intensity value of the pixel and the intensity value of a nearby pixel; and summing together the absolute differences found for all the pixels in the region.

6. The method of claim 5 wherein the nearby pixel is a pixel horizontally displaced by k pixels and vertically displaced by l pixels, where k and l are integers, one of which is not zero.

7. The method of claim 1 wherein the step of assigning a categorical depth value to each depth map region comprises finding among the n image regions corresponding the depth map region a region having a maximal sharpness value.

8. A device for producing a categorical depth map of a scene, the depth map comprising m depth map regions, where m≧2, the device comprising:

n camera means for detecting n images of the scene, where the n camera means are focused at different distances, where n>1;

image processing means for dividing each of the n images into m predetermined two-dimensional image regions such that each depth map region corresponds to n similar image regions taken from the n images, and for determining a sharpness value for each region of the m image regions in each image of the n images;

comparing means for assigning a categorical depth value to each depth map region of the m depth map regions, where the depth value for a depth map region is determined from an image number of a sharpest image selected from the n similar image regions taken from the n images.

9. The device of claim 8 further comprising a synch means for synchronizing the n camera means with each other so that they simultaneously detect the n images of the scene.

10. The device of claim 8 wherein the n camera means are oriented so that the n images represent very similar but slightly different perspectives of the scene.

11. The device of claim 8 further comprising a beam splitting means for ensuring that the n cameras view the scene from the same perspective.

12. The device of claim 8 further comprising a filtering means for reducing the intensity of light detected by the n camera means.

13. The device of claim 8 wherein the image processing means comprises a first means for finding, for each pixel in the region, the absolute difference between the intensity value of the pixel and the intensity value of a nearby pixel; and a second means for summing together the absolute differences found for all the pixels in the region.

14. The device of claim 13 wherein the nearby pixel is a pixel horizontally displaced by k pixels and vertically displaced by l pixels, where k and l are integers, one of which is not zero.

15. The device of claim 8 wherein the comparing means comprises a means for finding, among the n image regions corresponding the depth map region, a region having a maximal sharpness value.

16. The device of claim 8 further comprising n intensity control means for controlling the amount of light detected by the n camera means.

17. The device of claim 8 used for detecting the presence of an object.

18. The device of claim 8 used for detecting the speed of an object.

19. The device of claim 8 used to assist a visually impaired person.

20. A mobile robot comprising:

n camera means for detecting n images, where the camera means are focused at different distances;

image processing means for dividing each of the n images into m predetermined two-dimensional image regions such that n similar image regions taken from the n images are in correspondence with each other, and for determining a sharpness value for each image region in each image, where the sharpness value is given by the formula $$S(i,j) = \sum_{y=l+1}^{h} \sum_{x=k+1}^{w} |p(x, y) - p(x - k, y - l)|;$$

comparing means for generating a depth map by comparing the sharpness value of each region with the sharpness value of a corresponding similar region in another image; and motion control means for controlling the movement of a robot in response to information contained in the depth map.

\* \* \* \* \*